(12) United States Patent
Frédérick

(10) Patent No.: US 8,925,201 B2
(45) Date of Patent: Jan. 6, 2015

(54) METHOD AND APPARATUS FOR PROVIDING ROTOR DISCS

(75) Inventor: Michel Frédérick, Candiac (CA)

(73) Assignee: Pratt & Whitney Canada Corp., Longueuil (CA)

(*) Notice: Subject to any disclaimer, the term of this patent is extended or adjusted under 35 U.S.C. 154(b) by 1071 days.

(21) Appl. No.: 12/493,763

(22) Filed: Jun. 29, 2009

(65) Prior Publication Data

US 2010/0325852 A1    Dec. 30, 2010

(51) Int. Cl.
*B23P 15/04* (2006.01)
*B23P 15/00* (2006.01)
*F01D 5/30* (2006.01)
*F01D 5/02* (2006.01)

(52) U.S. Cl.
CPC .............. *F01D 5/02* (2013.01); *F05D 2230/12* (2013.01); *B23P 15/006* (2013.01); *F01D 5/3007* (2013.01); *F05D 2260/941* (2013.01)
USPC ........................................... 29/889.2; 29/558

(58) Field of Classification Search
CPC ......... B23P 15/006; B23P 13/04; B23P 15/38
USPC ............... 29/889.2, 889.3, 889.5, 889.6, 558, 29/889.21, 889.23
See application file for complete search history.

(56) References Cited

U.S. PATENT DOCUMENTS

| 3,290,124 | A | 12/1966 | Holtzclaw, Jr. |
| 3,337,336 | A | 8/1967 | Rao |
| 3,407,475 | A | 10/1968 | Koppius |
| 3,689,387 | A | 9/1972 | Jumer |
| 3,816,272 | A | 6/1974 | Joslin |
| 3,847,506 | A | 11/1974 | Straniti |
| 4,080,513 | A | 3/1978 | Cuneo et al. |
| 4,134,807 | A | 1/1979 | Briffod |
| 4,159,407 | A | 6/1979 | Wilkinson et al. |
| 4,229,218 | A | 10/1980 | Gulla et al. |
| 4,324,589 | A | 4/1982 | Gulla et al. |
| 4,339,282 | A | 7/1982 | Lada et al. |
| 4,411,730 | A | 10/1983 | Fishter et al. |
| 4,426,867 | A | 1/1984 | Neal et al. |

(Continued)

FOREIGN PATENT DOCUMENTS

| CA | 1317444 | 5/1993 |
| CA | 2366325 | 6/2003 |

(Continued)

OTHER PUBLICATIONS

Extended European Search Report, EPO Form 1507N, May 30, 2014, European Patent Office, Netherlands.

*Primary Examiner* — Christopher Besler

(74) *Attorney, Agent, or Firm* — Norton Rose Fulbright Canada LLP

(57) ABSTRACT

A method for providing a disc of a bladed rotor for use in a gas turbine engine including the steps of determining the location of blade fixing slots to be formed on the disc to receive the roots of respective blades, determining a virtual profile of each slot on the disc, and forming, prior to the slots being formed in the disc, a narrow, axial pilot slot centrally of the virtual profile of each slot.

8 Claims, 4 Drawing Sheets

(56) References Cited

U.S. PATENT DOCUMENTS

| | | | |
|---|---|---|---|
| 4,454,740 A | 6/1984 | Neal et al. | |
| 4,463,241 A | 7/1984 | Smith | |
| 4,536,932 A | 8/1985 | Athey | |
| 4,692,976 A | 9/1987 | Andrews | |
| 4,717,804 A | 1/1988 | Tomalin | |
| 4,759,595 A | 7/1988 | Boord et al. | |
| 4,762,464 A | 8/1988 | Vertz et al. | |
| 4,819,325 A | 4/1989 | Cross et al. | |
| 4,826,580 A | 5/1989 | Masuzawa et al. | |
| 4,888,863 A | 12/1989 | Cox et al. | |
| 5,004,883 A | 4/1991 | Brown et al. | |
| 5,113,583 A * | 5/1992 | Jenkel et al. | 29/889.21 |
| 5,188,514 A | 2/1993 | Inserra et al. | |
| 5,197,361 A | 3/1993 | Carrier et al. | |
| 5,222,865 A | 6/1993 | Corsmeier | |
| 5,229,324 A | 7/1993 | Turner et al. | |
| 5,248,381 A | 9/1993 | Dunker et al. | |
| 5,269,057 A | 12/1993 | Mendham | |
| 5,360,957 A | 11/1994 | Haefner et al. | |
| 5,457,330 A | 10/1995 | Turner et al. | |
| 5,465,154 A | 11/1995 | Levy | |
| 5,522,706 A | 6/1996 | Mannava et al. | |
| 5,556,257 A * | 9/1996 | Foster et al. | 416/241 R |
| 5,605,639 A | 2/1997 | Banks et al. | |
| 5,957,657 A | 9/1999 | Akita et al. | |
| 6,033,185 A | 3/2000 | Lammas et al. | |
| 6,177,299 B1 | 1/2001 | Hsu et al. | |
| 6,183,202 B1 | 2/2001 | Ganshaw | |
| 6,286,211 B1 | 9/2001 | Turnquist et al. | |
| 6,306,523 B1 | 10/2001 | Seong | |
| 6,317,960 B1 * | 11/2001 | Kragle | 29/558 |
| 6,362,446 B1 | 3/2002 | Jones et al. | |
| 6,478,545 B2 * | 11/2002 | Crall et al. | 416/213 R |
| 6,551,064 B1 | 4/2003 | Mannava et al. | |
| 6,565,317 B2 | 5/2003 | Beeck et al. | |
| 6,592,330 B2 | 7/2003 | Leeke et al. | |
| 6,627,835 B1 | 9/2003 | Chung et al. | |
| 6,646,225 B1 | 11/2003 | Wang et al. | |
| 6,754,955 B1 | 6/2004 | Carl, Jr. et al. | |
| 6,850,874 B1 | 2/2005 | Higuerey et al. | |
| 6,860,721 B2 | 3/2005 | Knott et al. | |
| 6,865,810 B2 | 3/2005 | Stinson | |
| 6,905,312 B2 | 6/2005 | Bourgy et al. | |
| 6,910,854 B2 | 6/2005 | Joslin | |
| 6,914,214 B2 | 7/2005 | Byrd et al. | |
| 6,945,749 B2 | 9/2005 | De Cardenas | |
| 6,969,817 B2 | 11/2005 | Lee et al. | |
| 6,994,526 B2 | 2/2006 | Furman et al. | |
| 7,007,382 B2 * | 3/2006 | Mantel | 29/889.2 |
| 7,007,383 B2 | 3/2006 | Przybylski et al. | |
| 7,097,422 B2 | 8/2006 | Rice et al. | |
| 7,204,677 B2 | 4/2007 | Mannava et al. | |
| 7,211,143 B2 | 5/2007 | Yang et al | |
| 7,476,085 B2 | 1/2009 | Mohr et al. | |
| 2001/0002667 A1 | 6/2001 | Jones et al. | |
| 2002/0025232 A1 | 2/2002 | Miller | |
| 2003/0024699 A1 | 2/2003 | Vinegar et al. | |
| 2004/0064945 A1 | 4/2004 | Howley | |
| 2004/0067131 A1 | 4/2004 | Joslin | |
| 2004/0109765 A1 | 6/2004 | Benedetti et al. | |
| 2004/0169016 A1 | 9/2004 | Adachi et al. | |
| 2005/0086804 A1 | 4/2005 | Packman et al. | |
| 2005/0274625 A1 | 12/2005 | Joslin | |
| 2006/0138091 A1 | 6/2006 | Lee | |
| 2006/0275553 A1 | 12/2006 | Subramanian | |
| 2007/0017819 A1 | 1/2007 | Joslin | |
| 2007/0292710 A1 | 12/2007 | Rigney et al. | |
| 2008/0078079 A1 * | 4/2008 | Ellis et al. | 29/889.1 |
| 2008/0206060 A1 | 8/2008 | Roberts | |
| 2008/0304972 A1 * | 12/2008 | Xiao | 416/203 |

FOREIGN PATENT DOCUMENTS

| | | |
|---|---|---|
| CA | 2502593 | 9/2006 |
| DE | 4203656 | 6/2000 |
| GB | 2442449 | 9/2008 |
| WO | 9517277 | 6/1995 |
| WO | 03059569 | 7/2003 |
| WO | 2006087292 | 8/2006 |

* cited by examiner

METHOD AND APPARATUS FOR PROVIDING ROTOR DISCS

TECHNICAL FIELD

The application relates generally to gas turbine engines and, more particularly, to a method and apparatus for providing rotor discs designed to mount blades thereto.

BACKGROUND

Conventional gas turbine engines include rotor blades which are removably mounted to respective rotor discs. The disc and blade fixings of a rotor assembly of gas turbine engines, particularly of the high pressure turbine rotor assembly, conventionally comprise an undulating or "firtree" shaped profile in order to meet the requirements of engine performance, weight reduction, secondary air consumption, disc/blade life considerations, etc.

The prior art is replete with attempts to reduce or compensate for the inherent stresses in the discs, created during the disc's manufacture, the formation of the blade fixing slots and/or the placement of the blade roots in the dovetail slots. However these solutions remain complicated and somewhat lacking.

Accordingly, there is a need to provide an improved method and apparatus for providing such discs.

SUMMARY

There is provided a method for reducing residual stress in a disc of a bladed rotor for use in a gas turbine engine, the method comprising: determining circumferential locations of blade fixing slots to be formed on the disc, the slots being adapted to receive the roots of respective airfoil blades; determining a virtual profile of each of said blade fixing slots on the disc; and forming, prior to the blade fixing slots being formed in the disc, a narrow, axial pilot slot centrally of the virtual profile of each said blade fixing slot, the pilot slot extending radially inwardly from an outer periphery of the disc.

There is also provided a process for providing an annular disc utilized as a support for mounting blades in a rotor assembly for a gas turbine engine, comprising the steps of: a) determining the location of blade fixing slots to be formed in the disc; b) forming a pilot slot within the confines of each said blade fixing slot to be formed by selecting a cutting tool and passing it axially and radially through a portion of the disc circumferentially centered at each location of the blade fixing slots to be formed; c) limiting the width of each pilot slot to a relatively narrow dimension compared to the width of the blade fixing slot; and then d) cutting the blade fixing slots in the disc.

There is further provided a preform for an annular disc utilized as a support for mounting blades in a rotor assembly for a gas turbine engine, the preform comprising a plurality of equally spaced pilot slots extending axially and radially inwards from a periphery of the preform at circumferential locations on the preform corresponding to blade fixing slots to be formed in the disc, wherein the preform has reduced inherent stresses compared to discs of rotor assemblies in which dovetail slots have been formed without pilot slots.

Further details will be apparent from the detailed description and figures included below.

DESCRIPTION OF THE DRAWINGS

Reference is now made to the accompanying figures, in which.

DETAILED DESCRIPTION

Figure 1:
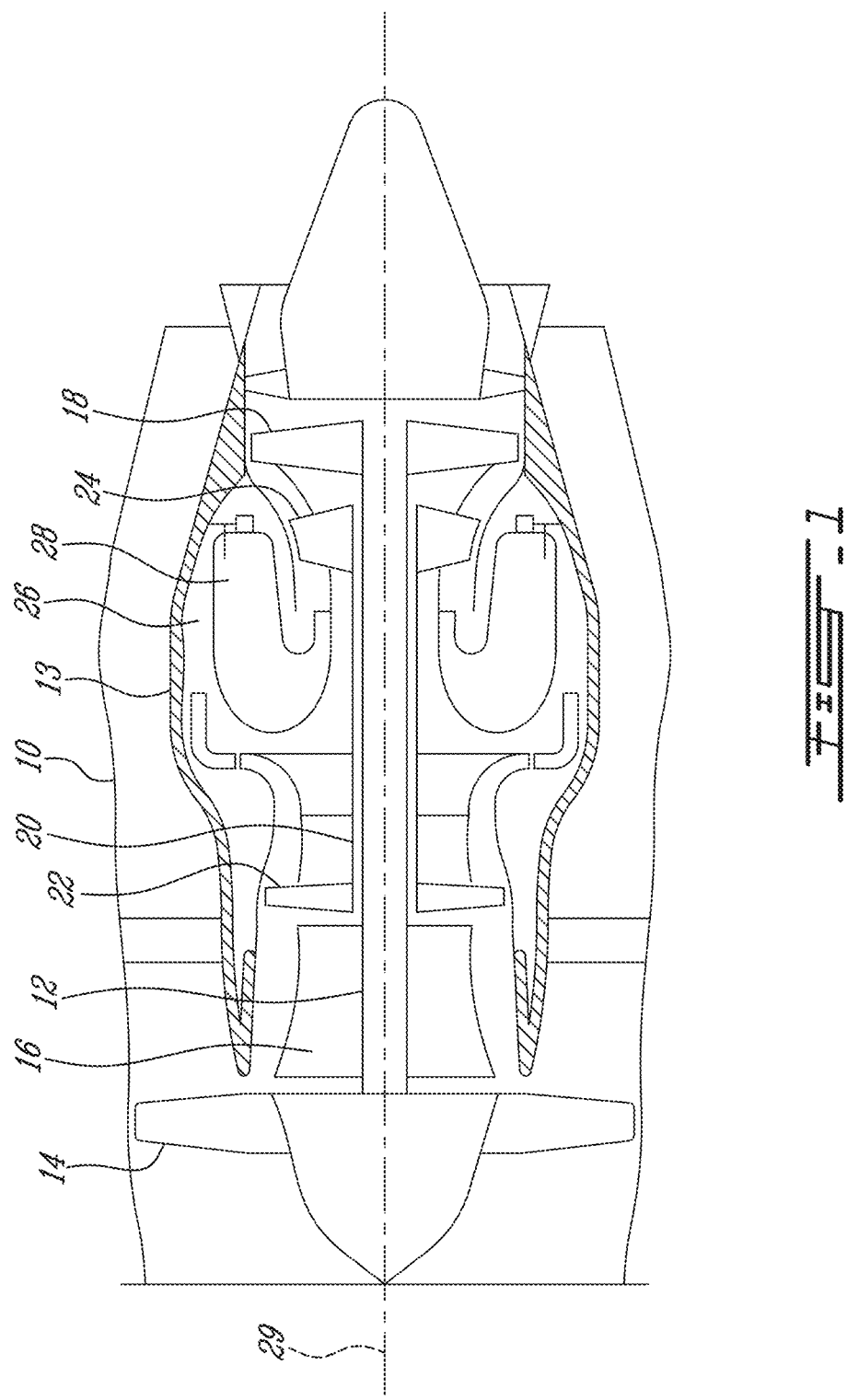
FIG. 1 is a schematic cross-sectional view of a turbofan gas turbine engine.

FIG. 1 illustrates a turbofan gas turbine engine 10 of a type preferably provided for use in subsonic flight, generally comprising in serial flow communication a fan 14 mounted to a shaft 12 through which ambient air is propelled, a multistage low pressure compressor assembly 16, a low pressure turbine section 18 with a spool assembly 20 that includes a high pressure compressor assembly 22 and a high pressure turbine assembly 24. The air compressed by the compressor is mixed with fuel and ignited in an annular reverse flow combustor 28, which is part of the gas generator section 26, for generating an annular stream of hot combustion gases from which the turbine sections extract energy.

Figure 2:
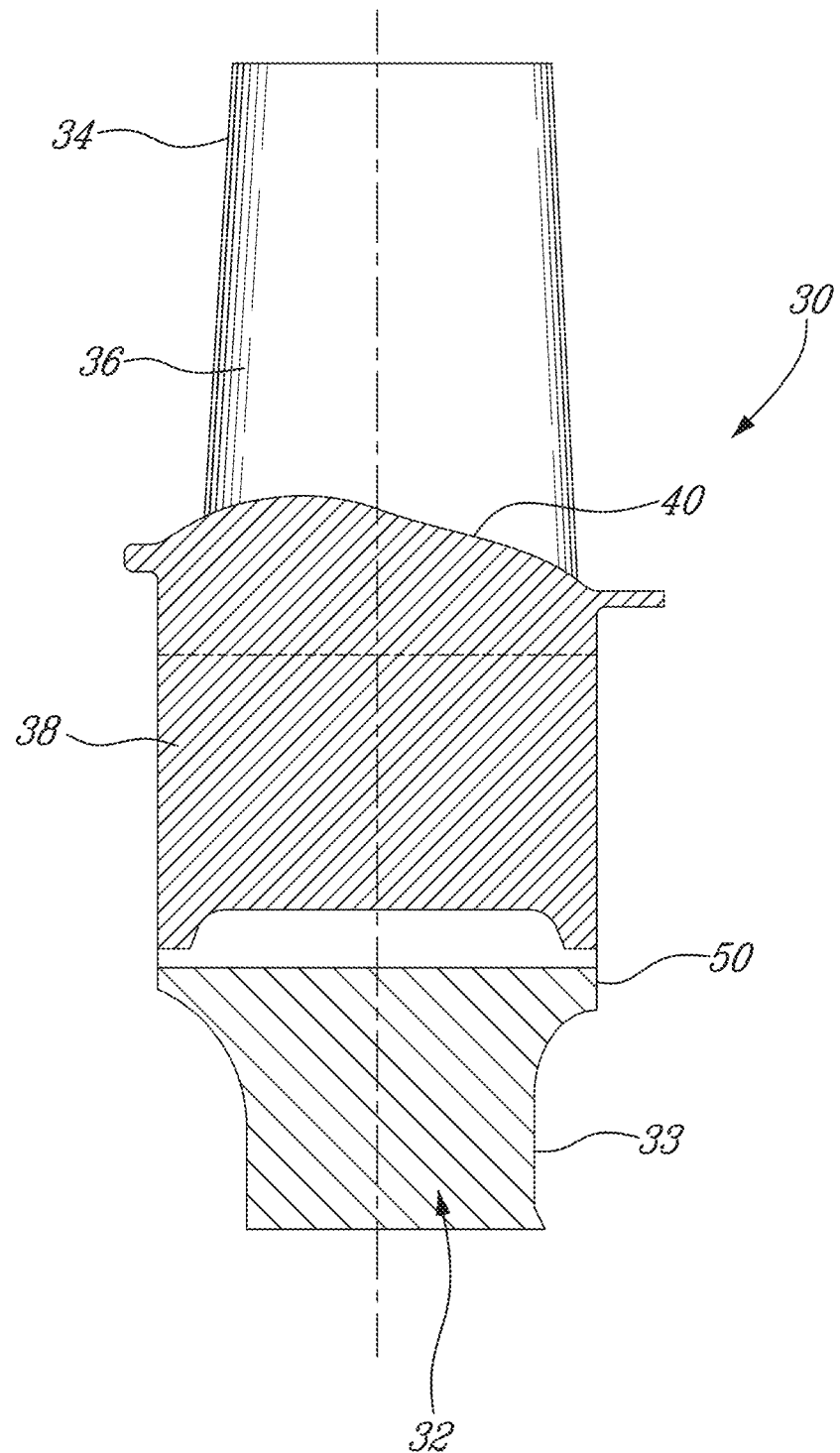
FIG. 2 is a fragmentary cross-sectional view taken through the rotational axis of a bladed rotor including a disc and radially extending blades mounted to the disc.
Figure 3:
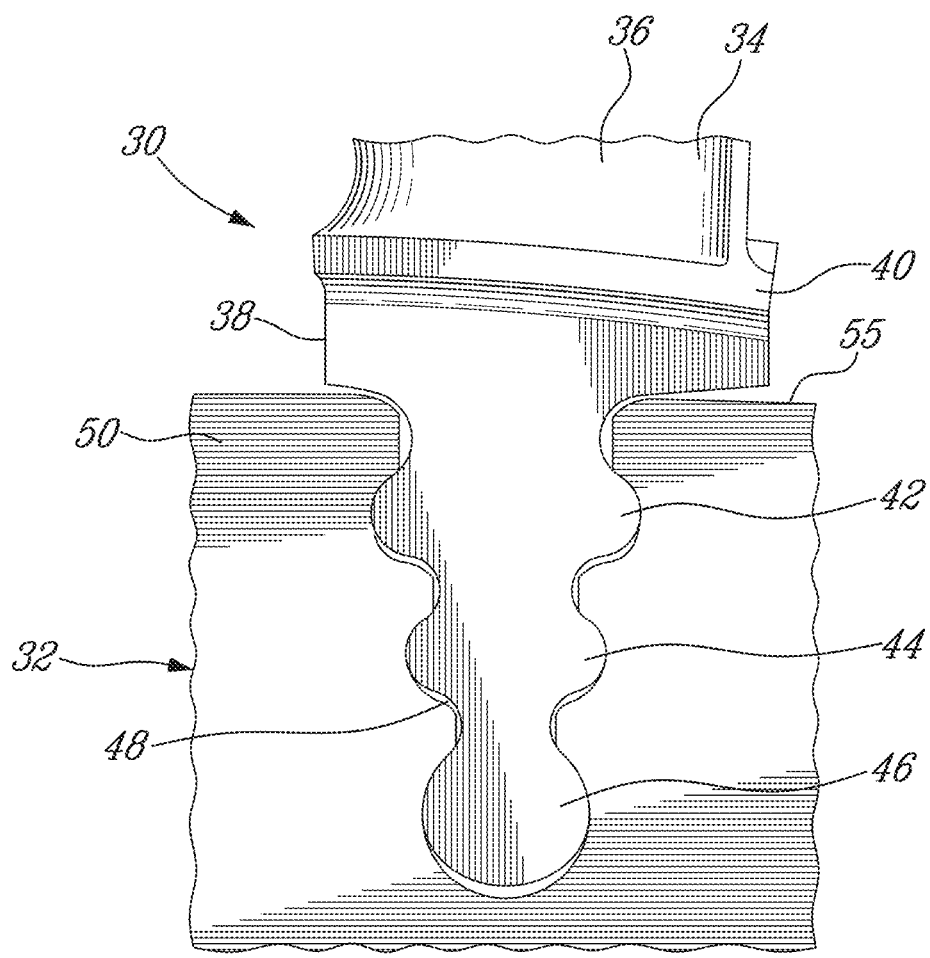
FIG. 3 is a fragmentary front elevational view of the disc and the blade of FIG. 2 showing a detail thereof.
Figure 4:
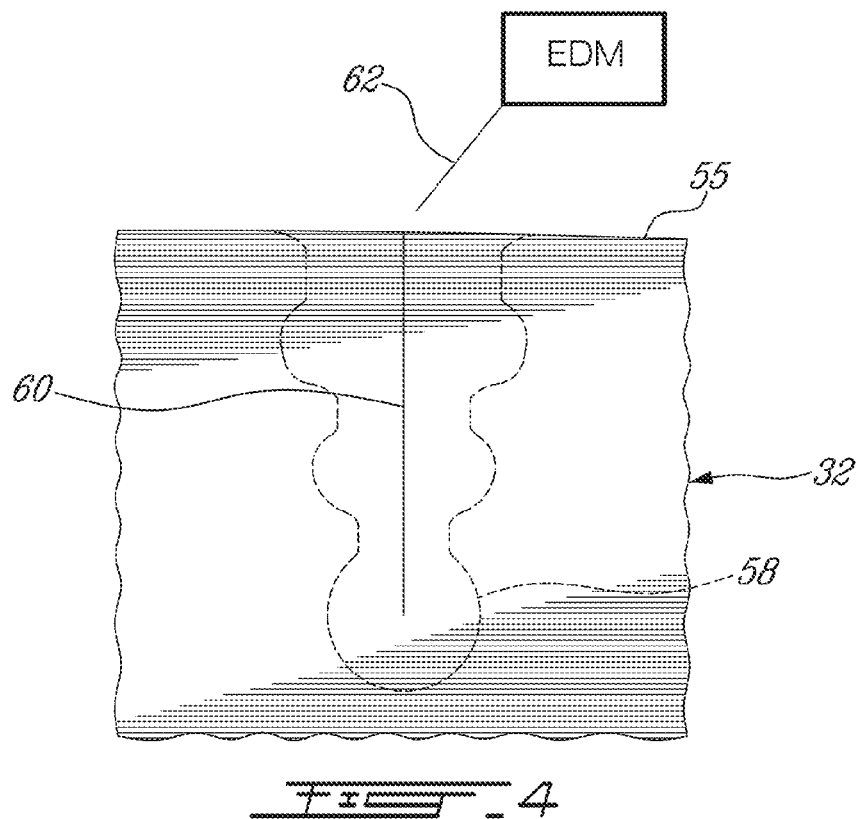
FIG. 4 is a schematic fragmentary view in front elevation of one embodiment of a disc showing an embodiment of a pilot slot.

Referring to FIGS. 1-3, a rotor assembly, for example a turbine rotor assembly 30 in one rotor stage of the high pressure turbine assembly 24, is depicted. The turbine rotor assembly 30 includes a turbine rotor disc 32 mounted on a rotating shaft of the high pressure spool assembly 20 and is rotatable about a longitudinal axis 29 of the engine, which is also the longitudinal axis of the turbine rotor assembly 30. An array of rotor blades 34 (only one is shown in FIG. 2) extend radially outwardly from the periphery of the turbine rotor disc 32. Each of the rotor blades 34 includes an airfoil section 36, a root section 38 and platform segments 40 extending laterally from opposed sides of the airfoil section 36 into opposing relationship with corresponding platform segments 40 of adjacent rotor blades 34.

The rotor assembly 30 will now be described in greater detail with reference, in particular, to FIGS. 2-5. The root section 38 of each turbine rotor blade 34 includes a series of smoothly curved lateral projections preferably referred to as lobes 42, 44 and 46 in pairs on opposite sides thereof, extending along the length of the blade root 38. The root section 38 of such a multi-lobed type is often referred to as a firtree, because of this characteristic shape.

The turbine rotor disc 32 includes a web section 33 extending radially outwardly from a hub (not shown) which is mounted to the rotating shaft of the high pressure spool assembly 20 of FIG. 1, and a rim section 50 extending radially outwardly from the web section 33. Rim section 50 has an axial thickness defined by respective front and rear sides thereof (not indicated), and also defines an outer periphery 55.

The turbine rotor disc 32 further includes a plurality of dovetail slots 48 (only one shown in FIG. 3), circumferentially spaced apart one from another and axially extending through the periphery 55 of the turbine rotor disc 32 which in this embodiment, is the entire axial thickness of the rim section 50. Each of the axial dovetail slots 48 includes a pair of opposed side walls each being defined in an undulating profile having substantially smoothly curved to thereby provide a profiled space defined between the opposed side walls, substantially in accordance with the firtree profile of the root section 38 of the respective turbine rotor blades 34 that are received within these dovetail slots 48.

Prior to assembling the rotor assembly 30, the disc 32 is formed by forging metal, such as forged or powder metallurgy nickel alloys for example, into an annulus with a peripheral surface 55 and a rim section 55. The thermal treatment as well as the spinning step may create stresses within the metal that can sometimes complicate the formation of the dovetail slots 48 as well as the retention relationship with the root section 38 of the blades 34.

The location and profile of each dovetail slot 48 is first virtually determined on the disc by a CNC program, and may be in practice physically marked on a surface of the disc 32. For instance, in FIG. 4 the firtree profile of the dovetail slot 48 is marked at 58. A narrow slit or pilot slot 60 is then cut into the metal of the outer rim section 55, at a point circumferentially centered within the dovetail slot 58. A wire EDM 62 may be utilized to cut the pilot slot 60, although other suitable cutting devises may also be used. The pilot slot 60, so formed, is planar, is radial and the rotational axis of the disc 32 lies in the projection of the plane. The width of the pilot slot 62 is, in one particular embodiment, 0.010 inches (0.0254 cm), which is the thickness of the EDM wire used to create the pilot slot. The pilot slot 62 clearly must not extend radially inwardly beyond a bottom of the virtual firtree slot profile 58 to be formed, and in one particular embodiment does not extend radially inwards beyond a distance of 0.100 inches (0.254 cm) from the bottom of the virtual firtree profile 58. In the embodiment depicted in FIG. 4, the pilot slot 62 extends radially inwardly, from the exterior surface 55 of the disc, to a point substantially near the center of the radius of curvature of the lowermost lobe of the dovetail slot 48 having the firtree profile 58.

Figure 5:
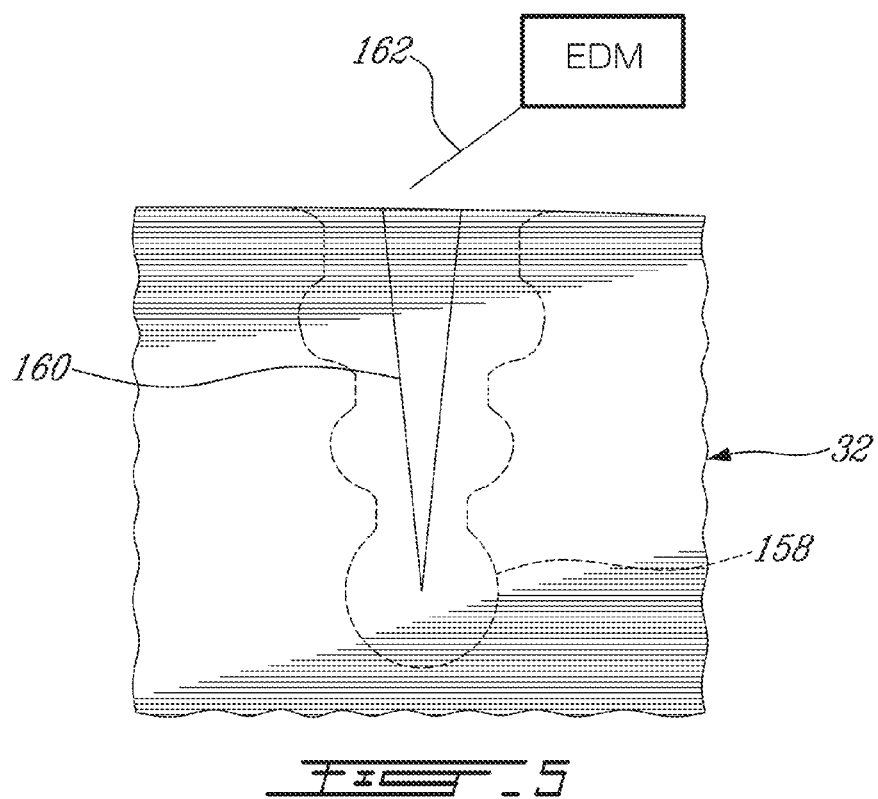
FIG. 5 is a schematic view similar to FIG. 4 of another embodiment of the pilot slot on a disc.

A further embodiment of the pilot slot 160 is shown in FIG. 5 where the pilot slot 160 is in the form of a V-shaped slot. In this embodiment the virtual dovetail slot/firtree profile is shown at 158. The V-shaped pilot slot 160 may also be cut using the wire EDM 162.

It has been found that by providing pilot slots 62, 162 at the location of a dovetail slot 48 to be formed in the disc, that the stresses in the disc may be reduced. Once all of the pilot slots 62, 162 have been formed, circumferentially about the perimeter of the disc, the actual dovetail slots 48 may be cut along the outlines of the virtual firtree profiles 58, 158. The roots 38 of the blades 36 can then be inserted axially into the dovetail slots 48. In some examples, further treatment of the dovetail slots (e.g. for stress relief, etc.) may not be required.

Once all the pilot slots 60, 160 have been cut into the disc, the dovetail slots 48 can be cut or otherwise machines into the disc in the regions identified by the virtual firtree profiles. A wire EDM process may also be used to cut the dovetail slots 48 in the disc.

The above description is meant to be exemplary only, and one skilled in the art will recognize that changes may be made to the embodiments described without departing from the scope of the invention disclosed. For example, the pilot slots 60, 160 may be of different profiles. However there is no co-relationship between the shape of the pilot slots 60, 160 and the profiles of the dovetail slots 48. Although wire EDM is described as suitable for providing the slot(s) in the disc, any suitable approach may be used to achieve this step. Still other modifications which fall within the scope of the present application will be apparent to those skilled in the art, in light of a review of this disclosure, and such modifications are intended to fall within the appended claims.

The invention claimed is:

1. A method of making blade fixing slots in a disc of a bladed rotor for use in a gas turbine engine, the method comprising:
    determining a plurality of circumferential locations on the disc for receiving the blade fixing slots, the blade fixing slots being adapted to receive roots of respective airfoil blades of the bladed rotor;
    determining a virtual full slot profile of each of said blade fixing slots, the virtual full slot profile being adapted to correspond to a profile of the roots of the airfoil blades;
    using wire electro-discharge machining (EDM) to form a single-cut pre-slot in the periphery of the disc at each of said plurality of circumferential locations, the single-cut pre-slots being planar slits which extend radially inwardly from an outer periphery of the disc, each planar slit having a uniform width corresponding to a diameter of a single EDM cutting wire from the wire EDM and thus a shape which does not correspond to a shape of the full slot profile of the blade fixing slot to be made, the single-cut pre-slots reducing residual stress in the disc prior to forming said blade fixing slots; and
    forming the blade fixing slots having said full slot profile in the periphery of the disc at each of said circumferential locations, using the single-cut pre-slots as pilot guides by circumferentially aligning a center of the full slot profiles with the single-cut pre-slots.

2. The method as defined in claim 1, wherein the step of forming the single-cut pre-slots includes extending the single-cut pre-slot to within a predetermined distance from a bottom of the virtual full slot profile.

3. The method as defined in claim 2, wherein the virtual full slot profile is firtree shaped and defines a number of lobes, further comprising selecting said predetermined distance to correspond to a center of a radius of curvature of a lowermost one of said lobes of the firtree shaped full slot profile.

4. The method as defined in claim 2, wherein the predetermined distance is 0.10".

5. The method as defined in claim 1, further comprising forming the disc by forging a metal, the metal being a forged or powder metallurgy nickel alloy.

6. The method of claim 5, further comprising performing a thermal treatment on the disc.

7. The method as defined in claim 1, further comprising using wire electro-discharge machining to form the blade fixing slots having said full slot profile in the disc.

8. The method as defined in claim 1, wherein the width of the pre-slot is about 0.010 in.

* * * * *